(12) United States Patent
Wang et al.

(10) Patent No.: US 10,197,846 B2
(45) Date of Patent: Feb. 5, 2019

(54) DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yupeng Wang, Beijing (CN); Xiaolong Li, Beijing (CN); Lifeng Lin, Beijing (CN); Chao Tian, Beijing (CN); Hongming Zhan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 14/892,066

(22) PCT Filed: Jun. 18, 2015

(86) PCT No.: PCT/CN2015/081739
§ 371 (c)(1),
(2) Date: Nov. 18, 2015

(87) PCT Pub. No.: WO2016/090885
PCT Pub. Date: Jun. 16, 2016

(65) Prior Publication Data
US 2016/0349572 A1   Dec. 1, 2016

(30) Foreign Application Priority Data

Dec. 9, 2014   (CN) .......................... 2014 1 0749511

(51) Int. Cl.
*G02F 1/1335* (2006.01)
*G02F 1/13357* (2006.01)
*G06F 1/16* (2006.01)

(52) U.S. Cl.
CPC ...... *G02F 1/133528* (2013.01); *G02F 1/1336* (2013.01); *G06F 1/163* (2013.01);
(Continued)

(58) Field of Classification Search
CPC .................................................. G02F 1/133528
See application file for complete search history.

(56) References Cited

U.S. PATENT DOCUMENTS

2004/0169786 A1   9/2004   Yamazaki et al.
2011/0025943 A1*  2/2011   Cho .................. G02F 1/133308
                                                  349/58
(Continued)

FOREIGN PATENT DOCUMENTS

CN       2217231 Y      1/1996
CN       1338713 A  *   3/2002   ............. G02F 1/133
(Continued)

OTHER PUBLICATIONS

First Chinese Office Action dated Sep. 29, 2016; Appln. No. 201410749511.3.
(Continued)

*Primary Examiner* — Edmond Lau
(74) *Attorney, Agent, or Firm* — Ladas & Parry LLP

(57) ABSTRACT

A display device includes a display component (1), which includes a liquid crystal panel and a backlight source (11) with the liquid crystal panel including a liquid crystal cell, a first polarizing sheet (12) located on a side of the liquid crystal cell near the backlight source, and a second polarizing sheet (16) located on a side of the liquid crystal cell away from the backlight source. One of the first polarizing sheet (12) and the second polarizing sheet (16) is movable.

11 Claims, 4 Drawing Sheets

(52) U.S. Cl.
CPC ............ *G02F 2001/133562* (2013.01); *G02F 2001/133567* (2013.01); *G02F 2201/46* (2013.01); *G02F 2203/48* (2013.01); *G02F 2203/62* (2013.01); *G02F 2203/66* (2013.01)

(56) References Cited

U.S. PATENT DOCUMENTS

| | | | |
|---|---|---|---|
| 2011/0102312 A1 | 5/2011 | Cho | |
| 2012/0170423 A1* | 7/2012 | Fujisawa | G04C 10/02 368/10 |
| 2014/0226102 A1* | 8/2014 | Zhang | G02F 1/133608 349/58 |
| 2014/0335316 A1* | 11/2014 | Fukushima | B32B 7/12 428/161 |
| 2015/0346537 A1* | 12/2015 | Yu | G02F 1/133308 349/60 |
| 2016/0011459 A1 | 1/2016 | Li et al. | |

FOREIGN PATENT DOCUMENTS

| | | |
|---|---|---|
| CN | 101369067 A | 2/2009 |
| CN | 201503526 U | 6/2010 |
| CN | 102057316 A | 5/2011 |
| CN | 103336386 A | 10/2013 |
| CN | 104090416 A | 10/2014 |
| CN | 104407470 A | 3/2015 |
| CN | 20421804 U | 4/2015 |
| WO | 2013051423 A1 | 4/2013 |

OTHER PUBLICATIONS

International Search Report & Written Opinion Appln. No. PCT/CN2015/081739; dated Sep. 11, 2015.
The Second Chinese Office Action dated May 17, 2017; Appln. No. 201410749511.3.
The Third Chinese Office Action dated Aug. 30, 2017; Appln. No. 201410749511.3.

\* cited by examiner

DISPLAY DEVICE

TECHNICAL FIELD

Embodiments of the present invention relate to a display device.

BACKGROUND

In recent years, wearable equipments are becoming popular because they are easy to wear and ready to be used by users at any moment. Nowadays, there are brought about a variety of wearable electronic equipments such as glasses, cap brims, watches etc. Intelligent watches belong to a relatively common type of wearable intelligent equipments. Users can use them to examine and record daily life data, for example, time, exercises, sleep and so on in real time and further synchronize the data with other electronic devices, making their quality of life improved greatly.

However, because the existing intelligent watches focus their functionality on amusements, the carried intelligent watches can not aid in the wearers' self-rescue when the wearers are trapped, especially, in a dark environment.

SUMMARY

An embodiment of the present invention provide a display device including a display component, wherein the display component includes a liquid crystal panel and a backlight source, the liquid crystal panel includes a liquid crystal cell, a first polarizing sheet located on a side of the liquid crystal cell near the backlight source, and a second polarizing sheet located on a side of the liquid crystal cell away from the backlight source, and one of the first polarizing sheet and the second polarizing sheet is movable.

Optionally, the way of movement involves rotating horizontally around a geometric center.

Optionally, the first polarizing sheet and the second polarizing sheet are circular or square.

Optionally, a transparent cover is further disposed on a side of the second polarizing sheet away from the liquid crystal cell and the second polarizing sheet is adhered to the transparent cover, so that the second polarizing sheet can be driven to rotate by rotating the transparent cover.

Optionally, the display device further includes a wearable component and the display component is disposed on the wearable component with a rotation marker being disposed on the surface of the wearable component along a periphery of the liquid crystal panel.

Optionally, the first polarizing sheet, the second polarizing sheet and the liquid crystal cell are all movable.

Optionally, the way of movement is that the liquid crystal panel constituted by the first polarizing sheet, the second polarizing sheet and the liquid crystal cell is separable from the backlight source.

Optionally, the display device further includes a wearable component, which is configured with a fastening structure to secure the liquid crystal panel when the liquid crystal panel is separated from the backlight source.

Optionally, one of the liquid crystal panel and the backlight source is configured with a structure with a female thread and the other is configured with a engaging with a male thread, so that the liquid crystal panel and the backlight source can be bonded together or separated apart through the structure.

Optionally, the liquid crystal panel and the backlight source are connected through a hinge, so that the liquid crystal panel can be rotated around the hinge to be bonded to or separated from the backlight source.

Optionally, one of the liquid crystal panel and the backlight source is configured with a sliding track and the other is configured with a sliding block that can slide on the sliding track, so that the liquid crystal panel and the backlight source can be bonded together or separated apart through the sliding track and the sliding block.

BRIEF DESCRIPTION OF DRAWINGS

In order to clearly illustrate the technical solutions of embodiments of the present invention, the drawings for the embodiments will be briefly described in the following; it is obvious that the drawings to be described hereafter are only related to some embodiments of the present invention and thus are not limitative of the present invention.

DETAILED DESCRIPTION

In order to make objects, technical details and advantages of the embodiments of the present invention apparent, the technical solutions of the embodiments will be described in a clearly and fully understandable way in connection with the drawings related to the embodiments of the present invention. Apparently, the described embodiments are just some, not all of the embodiments of the present invention. Based on the described embodiments herein, those skilled in the art can obtain other embodiments without any creative work, which fall within the scope claimed by the present invention.

An embodiment of the present invention provides a display device, which includes a display component having a liquid crystal panel and a backlight source. The liquid crystal panel includes a liquid crystal cell, a first polarizing sheet located on the side of the liquid crystal cell near the backlight source, and a second polarizing sheet on the side of the liquid crystal cell away from the backlight source. At least one of the first and second polarizing sheets is movable.

Figure 1:
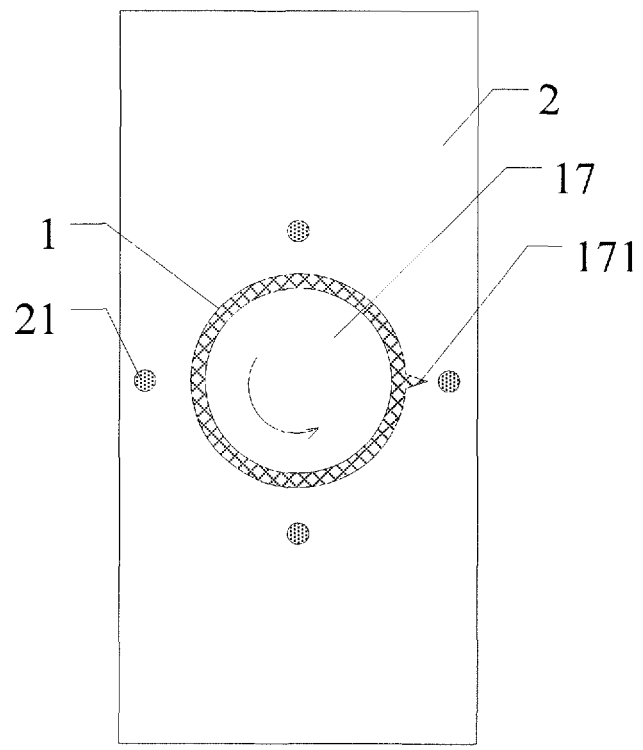
FIG. 1 is a schematic diagram of a display device provided an embodiment of the present invention.
Figure 2:
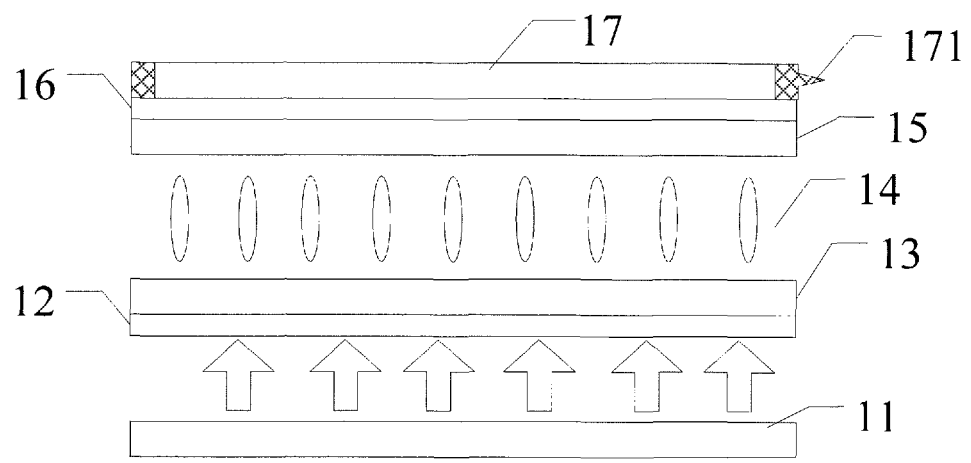
FIG. 2 is a schematic diagram of the display component of the display device illustrated in FIG. 1.

For example, the display device in an embodiment of the present invention can be a wearable equipment such as an intelligent watch and is illustrated in FIG. 1. As illustrated in FIG. 1, the display device includes a display component 1 and a wearable component 2 (for example a watchband), and the display component 1 is disposed on the wearable component 2. As illustrated in FIG. 2, the display component 1 includes a backlight source 11 and a liquid crystal panel. The liquid crystal panel includes a liquid crystal cell that is constituted with an opposite substrate 15, a liquid crystal layer 14, and an array substrate 13, a first polarizing sheet 12 located on the side of the liquid crystal cell near the backlight source 11, and a second polarizing sheet 16 located on the side of the liquid crystal cell away from the backlight source 11. For example, the second polarizing sheet 16 is movable. Furthermore, the second polarizing sheet 16 may be rotated horizontally around its geometric center. Alternatively, the first polarizing sheet 12 is movable. Furthermore, the first polarizing sheet 12 may be rotated horizontally around its geometric center.

For example, the first polarizing sheet 12 and the second polarizing sheet 16 may be circular or square. For example, a transparent cover 17 is added, and the second polarizing sheet 16 is adhered to this transparent cover 17, so that the second polarizing sheet 16 may be driven to rotate through rotating the transparent cover 17. The second polarizing sheet 16 may be adhered to any one of the upper and lower sides of the transparent cover 17. As illustrated in FIG. 2, the transparent cover 17 may be disposed on the side of the second polarizing sheet 16 away from the liquid crystal cell to protect the polarizing sheet.

Figure 3:
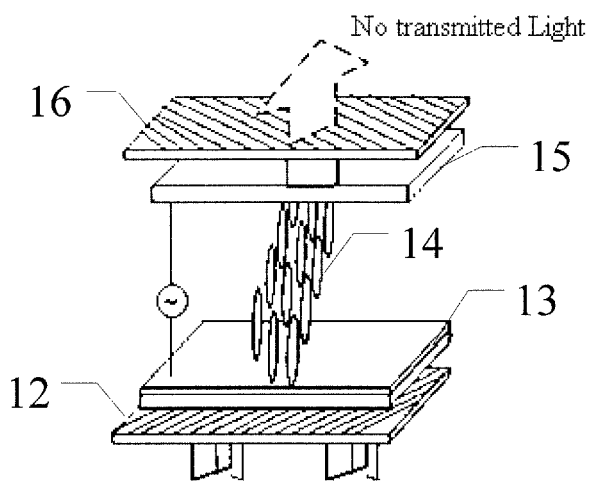
FIG. 3 is a schematic diagram of the display device illustrated in FIG. 1 in a display mode.
Figure 4:
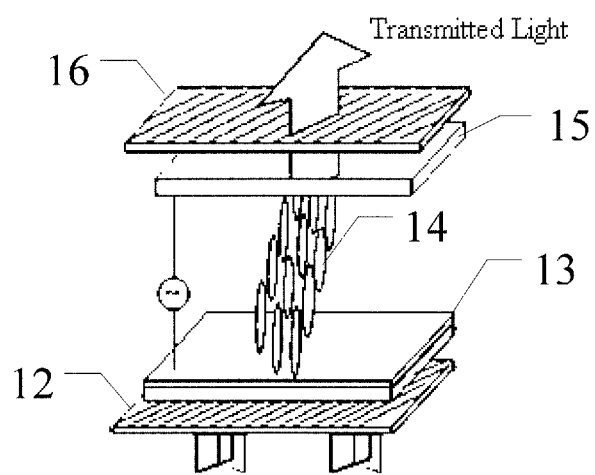
FIG. 4 is a schematic diagram of the display device illustrated in FIG. 1 in a lighting mode.

In the display device provided in an embodiment of the present invention, the relative position of the light transmission axis of the second polarizing sheet 16 with respect to that of the first polarizing sheet 12 can be changed by rotating the second polarizing sheet 16 of the display device, so that the brightness of the liquid crystal panel can be changed to achieve the lighting function. With the liquid crystal panel illustrated in FIG. 3 (in the normally-white TN display mode) as an example, when it is used to display images, the light transmission axes of the first and second polarizing sheets 12, 16 are orthogonal to each other, e.g., the light transmission axis of the first polarizing sheet 12 is 45° while the light transmission axis of the second polarizing sheet 16 is 135°, and the liquid crystal layer 14 conducts light modulation to display images if a voltage is applied between the opposite substrate 15 and the array substrate 13. In order to switch the display device to the lighting mode, as illustrated in FIG. 4, the second polarizing sheet 16 is rotated to make its light transmission axis (for example, rotated to be 45°) parallel to the light transmission axis of the first polarizing sheet 12, so that the light having passed through the first polarizing sheet 12 can radiate outside through the second polarizing sheet 16 and thus the brightness of the liquid crystal panel is improved, realizing the lighting function. In addition, the above-mentioned liquid crystal panel may be in the ADS display mode as well, in which the concept of changing the brightness of the liquid crystal panel by rotating the polarizing sheet is similar to that in the TN display mode and will not be further detailed here.

The pixels in the liquid crystal panel may not all have consistent brightness. Therefore, during the operation of the display device, in order to achieve a relatively high brightness in the lighting mode, a user can rotate the second polarizing sheet 16 slowly and at the same time observe the variation of the brightness of the liquid crystal panel so as to obtain the optimal rotating position corresponding to the relatively high brightness. Furthermore, for the convenience of recording the optimal rotating position for the user, as illustrated in FIG. 1, rotation markers 21 may be disposed on the surface of the wearable component 2 and a pointer 171 may be disposed on the transparent cover 17 with the rotation markers 21 being distributed uniformly along the periphery of the liquid crystal panel. When the user uses the lighting mode again, the recorded rotating position can be reproduced directly through the rotation markers 21 and the pointer 171.

In display devices provided in embodiments of the present invention, the polarizing sheets in display components may be configured to be of movable structures. When a user is trapped, especially, in a dark environment, the brightness of the display device can be improved to achieve the lighting function by moving a polarizing sheet, so that the user can send out distress signals for his rescue utilizing the light from the display device.

Figure 5:
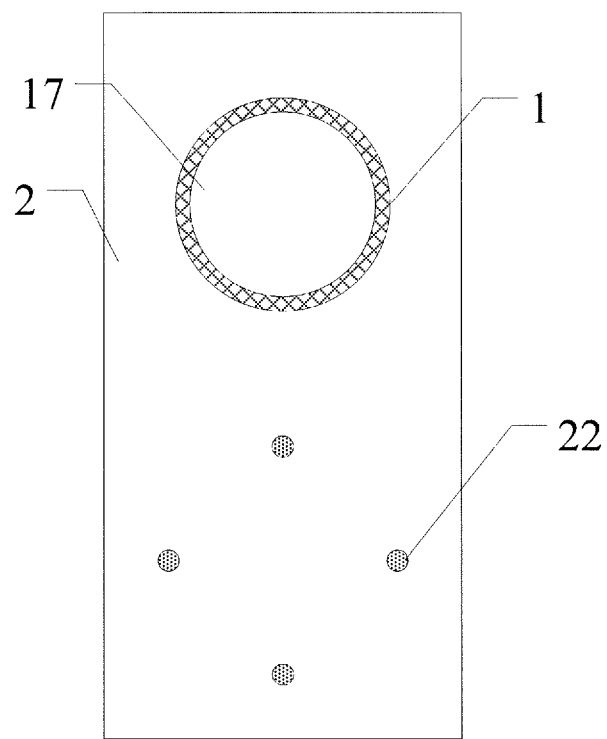
FIG. 5 is a schematic diagram of another display device provided an embodiment of the present invention.
Figure 6:
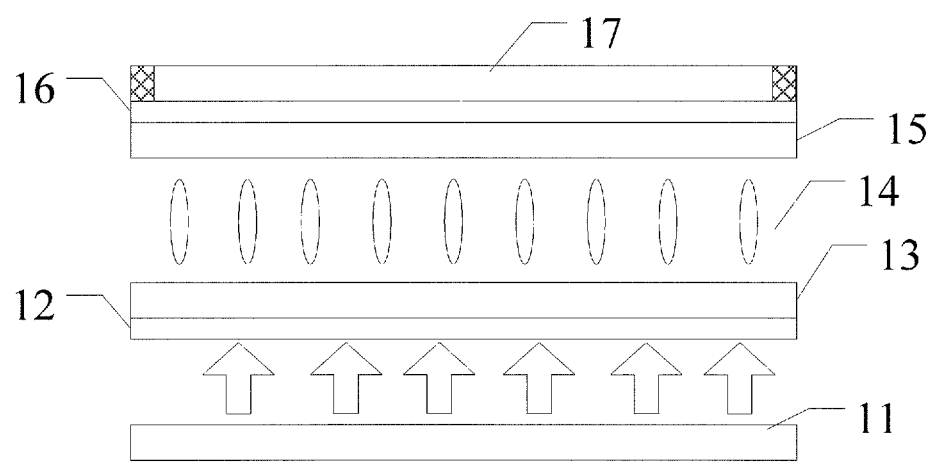
FIG. 6 is a schematic diagram of a display component of the display device illustrated in FIG. 5.

FIG. 5 is a schematic diagram of another display device provided in an embodiment of the present invention, which includes a display component 1 and a wearable component 2 (for example, a watchband). As illustrated in FIG. 6, the display component 1 includes a backlight source 11 and a liquid crystal panel. The liquid crystal panel includes a liquid crystal cell that is constituted by an opposite substrate 15, a liquid crystal layer 14, and an array substrate 13, a first polarizing sheet 12 located on the side of the liquid crystal cell near the backlight source 11, and a second polarizing sheet 16 located on the side of the liquid crystal cell away from the backlight source 11. For example, the first polarizing sheet 12, the second polarizing sheet 16, and the liquid crystal cell are all movable. For example, the way to achieve the movement is that the liquid crystal panel constituted by the first polarizing sheet 12, the second polarizing sheet 16 and the liquid crystal cell is separable from the backlight source 11.

For example, the second polarizing sheet 16 is also configured with a transparent cover 17 for its protection; in this case, the first polarizing sheet 12, the second polarizing sheet 16, the transparent cover 17 and the liquid crystal cell are all movable. For example, the way to achieve the movement is that the liquid crystal panel constituted by the first polarizing sheet 12, the second polarizing sheet 16, the transparent cover 17 and the liquid crystal cell is separable from the backlight source 11.

Figure 7:
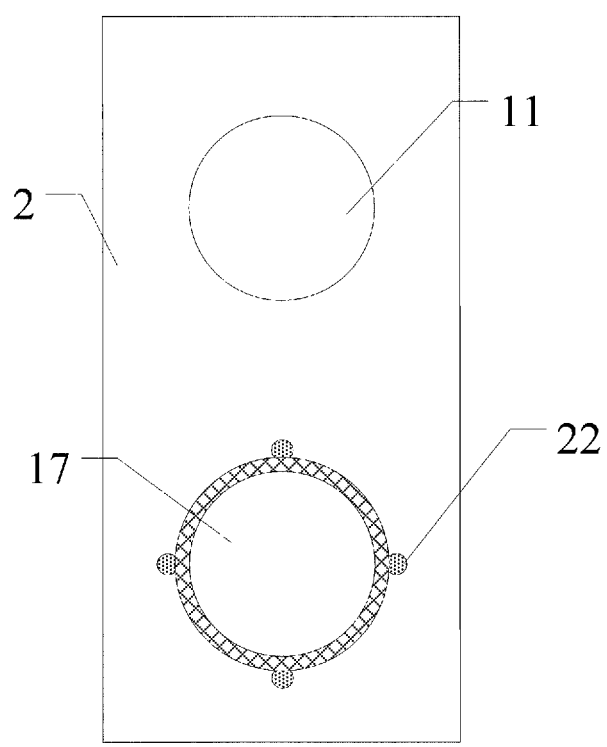
FIG. 7 is a schematic diagram of the display device illustrated in FIG. 5 in a lighting mode.

For example, in the display device provided in an embodiment of the present invention, the backlight source 11 and the liquid crystal panel can be bonded together through screw fastening, i.e., one of the liquid crystal panel and the backlight source 11 is configured with a structure with a female thread and the other is configured with an engaging structure with a male thread, so that the liquid crystal panel and the backlight source 11 can be bonded together or separated apart through the structures. For example, when the display device is switched from the display mode to the lighting mode, the whole liquid crystal panel can be driven to rotate only by twisting the transparent cover 17 of the liquid crystal panel, so that the liquid crystal panel can be separated from the backlight source 11. As illustrated in FIG. 7, when the liquid crystal panel is completely separated from the backlight source 11, the backlight source 11 is completely uncovered, so that the lighting function is achieved. In contrast to the way in which the lighting mode is realized by rotating a polarizing sheet, this way improves the lighting brightness greatly by separating the liquid crystal panel from the backlight source 11 to provide lighting directly from the backlight source 11.

For example, with reference to FIG. 6 and FIG. 7, the wearable component 2 of the display device may also be configured with a fastening structure 22, such as a snap fastener. When the liquid crystal panel is separated from the backlight source 11, the liquid crystal panel may be secured to the wearable component 2 through the fastening structure 22 to prevent itself from being lost or freely moving.

The liquid crystal panel and the backlight source may be connected in a different way. For example, the liquid crystal panel and the backlight source may be connected through a hinge, so that the liquid crystal panel may be rotated around the hinge so as to be bonded to or separated from the backlight source. For example, one of the liquid crystal panel and the backlight source 11 may be configured with a sliding track and the other may be configured with a sliding block that can slide on the sliding track, so that the liquid crystal panel and the backlight source 11 may be bonded together or separated apart through the sliding track and the sliding block.

What has been described above is related to the illustrative embodiments of the present invention only and not limitative to the scope of the present invention; the scope of the present invention is defined by the accompanying claims.

The present application claims priority of China Patent application No. 201410749511.3 filed on Dec. 9, 2014, the content of which is incorporated in its entirety as part of the present application by reference herein.

The invention claimed is:

1. A display device comprising a display component, wherein the display component comprises a liquid crystal panel and a backlight source, the liquid crystal panel comprises a liquid crystal cell, a first polarizing sheet located on a side of the liquid crystal cell near the backlight source, and a second polarizing sheet located on a side of the liquid crystal cell away from the backlight source, and at least one of the first polarizing sheet and the second polarizing sheet is movable, wherein, the display device further comprises a wearable component, the display component is disposed on the wearable component, the first polarizing sheet, the second polarizing sheet and the liquid crystal cell are all movable and a way of movement is that the liquid crystal panel constituted by the first polarizing sheet, the second polarizing sheet and the liquid crystal cell is separable from the backlight source, the wearable component is configured with a fastening structure to secure the liquid crystal panel on the wearable component upon the liquid crystal panel being separated and disconnected from the backlight source.

2. The display device of claim 1, wherein a way of movement involves rotating horizontally around a geometric center.

3. The display device of claim 1, wherein the first polarizing sheet and the second polarizing sheet are circular or square.

4. The display device of claim 1, wherein a transparent cover is further disposed on a side of the second polarizing sheet away from the liquid crystal cell and the second polarizing sheet is adhered to the transparent cover, so that the second polarizing sheet can be driven to rotate by rotating the transparent cover.

5. The display device of claim 1, a rotation marker is disposed on the surface of the wearable component along a periphery of the liquid crystal panel.

6. The display device of claim 1, wherein one of the liquid crystal panel and the backlight source is configured with a structure with a female thread and the other is configured with a engaging with a male thread, so that the liquid crystal panel and the backlight source can be bonded together or separated apart through the structure.

7. The display device of claim 1, wherein the liquid crystal panel and the backlight source are connected through a hinge, so that the liquid crystal panel can be rotated around the hinge so as to be bonded to or separated from the backlight source.

8. The display device of claim 1, wherein one of the liquid crystal panel and the backlight source is configured with a sliding track and the other is configured with a sliding block that can slide on the sliding track, so that the liquid crystal panel and the backlight source can be bonded together or separated apart through the sliding track and the sliding block.

9. The display device of claim 2, wherein the first polarizing sheet and the second polarizing sheet are circular or square.

10. The display device of claim 2, wherein a transparent cover is further disposed on a side of the second polarizing sheet away from the liquid crystal cell and the second polarizing sheet is adhered to the transparent cover, so that the second polarizing sheet can be driven to rotate by rotating the transparent cover.

11. The display device of claim 2, further comprising a wearable component, wherein the display component is disposed on the wearable component and a rotation marker is disposed on the surface of the wearable component along a periphery of the liquid crystal panel.

* * * * *